United States Patent
Ahn et al.

(10) Patent No.: US 12,245,628 B2
(45) Date of Patent: Mar. 11, 2025

(54) EXTERNAL HEATING-TYPE AEROSOL GENERATING DEVICE AND CIGARETTE USED THEREIN

(71) Applicant: KT&G CORPORATION, Daejeon (KR)

(72) Inventors: Ki Jin Ahn, Daejeon (KR); Soo Ho Kim, Cheongju-si (KR); Jong Yeol Kim, Sejong (KR); Chang Jin Park, Sejong (KR); Jin Chul Yang, Sejong (KR)

(73) Assignee: KT&G CORPORATION, Daejeon (KR)

( * ) Notice: Subject to any disclaimer, the term of this patent is extended or adjusted under 35 U.S.C. 154(b) by 553 days.

(21) Appl. No.: 17/291,335

(22) PCT Filed: Dec. 30, 2020

(86) PCT No.: PCT/KR2020/019396
§ 371 (c)(1),
(2) Date: May 5, 2021

(87) PCT Pub. No.: WO2021/177574
PCT Pub. Date: Sep. 10, 2021

(65) Prior Publication Data
US 2022/0264938 A1   Aug. 25, 2022

(30) Foreign Application Priority Data

Mar. 2, 2020   (KR) .................. 10-2020-0026119

(51) Int. Cl.
*A24D 1/20*   (2020.01)
*A24D 1/02*   (2006.01)

(52) U.S. Cl.
CPC ............... *A24D 1/20* (2020.01); *A24D 1/02* (2013.01)

(58) Field of Classification Search
CPC .................................. A24D 1/20; A24D 1/02
USPC ........................................................ 131/329
See application file for complete search history.

(56) References Cited

U.S. PATENT DOCUMENTS

| | | | |
|---|---|---|---|
| 8,151,805 B2 * | 4/2012 | Takeda | A24D 1/02 |
| | | | 131/365 |
| 8,689,804 B2 | 4/2014 | Fernando et al. | |
| 9,220,301 B2 * | 12/2015 | Banerjee | A24D 3/067 |
| 9,394,179 B2 * | 7/2016 | Luan | B01J 20/28061 |
| 9,739,013 B2 | 8/2017 | Kida et al. | |
| 9,775,377 B2 | 10/2017 | Fritzsching et al. | |

(Continued)

FOREIGN PATENT DOCUMENTS

| | | |
|---|---|---|
| CN | 106686992 A | 5/2017 |
| CN | 108135289 A | 6/2018 |

(Continued)

OTHER PUBLICATIONS

US 10,856,569 B2, 12/2020, Malgat et al. (withdrawn)

(Continued)

*Primary Examiner* — Gary F Paumen
(74) *Attorney, Agent, or Firm* — Sughrue Mion, PLLC

(57) ABSTRACT

Provided are an external heating-type aerosol generating device and a cigarette used therein. Because heat energy is easily transferred to the cigarette, a sufficient amount of smoke may be provided to a user in initial puffs so that the user may have a satisfactory smoking experience.

13 Claims, 9 Drawing Sheets

(56) References Cited

U.S. PATENT DOCUMENTS

| | | | |
|---|---|---|---|
| 10,258,079 B2* | 4/2019 | Banerjee | A24B 15/165 |
| 10,849,357 B2 | 12/2020 | Roudier et al. | |
| 10,912,330 B2* | 2/2021 | Malgat | A24F 40/00 |
| 11,076,633 B2 | 8/2021 | Mohseni | |
| 11,800,891 B2 | 10/2023 | Mohseni | |
| 2007/0215168 A1* | 9/2007 | Banerjee | A24D 1/22 |
| | | | 131/335 |
| 2007/0259124 A1* | 11/2007 | Luan | B01J 20/28059 |
| | | | 428/408 |
| 2014/0345634 A1 | 11/2014 | Zuber et al. | |
| 2016/0073687 A1* | 3/2016 | Banerjee | A24B 15/165 |
| | | | 131/334 |
| 2016/0295926 A1 | 10/2016 | Zuber | |
| 2016/0302479 A1* | 10/2016 | Luan | B01J 20/28035 |
| 2016/0331031 A1* | 11/2016 | Malgat | A24D 1/20 |
| 2017/0055576 A1 | 3/2017 | Beeson et al. | |
| 2019/0191760 A1 | 6/2019 | Banerjee et al. | |
| 2019/0200669 A1 | 7/2019 | Lang et al. | |
| 2020/0120978 A1* | 4/2020 | Malgat | A24D 1/20 |
| 2020/0221760 A1* | 7/2020 | Mohseni | A24D 1/22 |
| 2020/0359688 A1 | 11/2020 | Jang et al. | |
| 2021/0106051 A1 | 4/2021 | Han et al. | |
| 2021/0315263 A1* | 10/2021 | Mohseni | A24D 1/02 |
| 2022/0264938 A1 | 8/2022 | Ahn et al. | |
| 2024/0206521 A1 | 6/2024 | Robinson et al. | |

FOREIGN PATENT DOCUMENTS

| | | |
|---|---|---|
| CN | 209546905 U | 10/2019 |
| CN | 110520001 A | 11/2019 |
| CN | 113597264 B | 10/2023 |
| EP | 3 453 268 A1 | 3/2019 |
| EP | 3556230 A2 | 10/2019 |
| JP | 9-217054 A | 8/1997 |
| JP | 2010-506594 A | 3/2010 |
| JP | 2017-501676 A | 1/2017 |
| JP | 2018-531587 A | 11/2018 |
| JP | 2019-531086 A | 10/2019 |
| KP | 10-2016-0096590 A | 8/2016 |
| KR | 10-0844445 B1 | 7/2008 |
| KR | 10-2011-0096548 A | 8/2011 |
| KR | 10-1082646 B1 | 11/2011 |
| KR | 10-1357972 B1 | 2/2014 |
| KR | 10-2014-0119063 A | 10/2014 |
| KR | 10-1812693 B1 | 12/2017 |
| KR | 10-2018-0111460 A | 10/2018 |
| KR | 10-2019-0093027 A | 8/2019 |
| KR | 10-2019-0120413 A | 10/2019 |

OTHER PUBLICATIONS

Office Action dated Oct. 26, 2021 from the Korean Intellectual Property Office in KR Application No. 10-2020-0026119.
International Search Report dated Jul. 19, 2021 from the International Searching Authority in International Application No. PCT/KR2020/019396.
Communication dated Apr. 27, 2022 from the Korean Intellectual Property Office in Application No. 10-2020-0026119.
Extended European Search Report dated Feb. 25, 2022 in Application No. 20916235.3.
Chinese Office Action dated Feb. 3, 2023 in Chinese Application No. 202080007882.8.
Japanese Office Action dated Mar. 22, 2023 in Japanese Application No. 2021-526245.
Office Action dated Sep. 13, 2022 in JP Application No. 2021-526245.
European Office Action dated Sep. 27, 2023 in European Application No. 20916253.3.
Japanese Office Action dated Oct. 3, 2023 in Japanese Application No. 2021-526245.
Invalidation Request issued Apr. 10, 2024 in Chinese Application No. 202080007882.8.
Supplementary Opinion on Invalidation Declaration issued Apr. 10, 2024 in Chinese Application No. 202080007882.8.
Communication dated Jan. 7, 2024 in Japanese Application No. 2024-014801.

* cited by examiner

EXTERNAL HEATING-TYPE AEROSOL GENERATING DEVICE AND CIGARETTE USED THEREIN

TECHNICAL FIELD

The present disclosure relates to an external heating-type aerosol generating device and a cigarette used therein, and more particularly, to an aerosol generating device that generates an aerosol while a heater included in the aerosol generating device heats a cigarette without directly contacting the cigarette, and a cigarette used in the aerosol generating device.

BACKGROUND ART

Recently, there has been increasing demand for alternative ways of overcoming the disadvantages of common cigarettes For example, there is an increasing demand for a method of generating aerosol by heating an aerosol generating material in cigarettes, rather than by burning cigarettes. Accordingly, research into a heating-type cigarette or a heating-type aerosol generator has been actively conducted.

Among aerosol generating devices, there is an external heating-type aerosol generating device in which an inserted cigarette is heated from outside the cigarette to generate aerosols inhalable by a user. An external heating-type aerosol generating device is characterized in that, when a cigarette including an aerosol generating substrate is inserted, a heater does not directly contact the inserted cigarette, but external heat is applied thereto to generate aerosols. Thus, the heat energy of the heater is not properly transferred to the cigarette, and the user fails to receive a sufficient amount of smoke from the aerosol generating device in an initial puff period in which the user starts puffing.

When a heating temperature of a heater is recklessly set to be high to increase the amount of smoke, the life of a battery supplying power to the heater is shortened, and it is difficult to provide a user with a uniform tobacco taste. Therefore, there is a need for technology for appropriately maintaining a heating temperature and providing a user with a uniform smoking sensation.

DESCRIPTION OF EMBODIMENTS

Technical Problem

Technical problems to be solved by the present disclosure are to provide a cigarette, to which the heat energy of a heater of an external heating-type aerosol generating device is effectively transferred when the cigarette is inserted into the aerosol generating device and the heater is heated, and an aerosol generating device using the cigarette.

Solution to Problem

According to one or more embodiments of the present disclosure, there is provided a cigarette in which an aerosol is generated from a medium in a medium portion through heating, the cigarette including a medium portion wrapper surrounding the medium portion, and an outer shell collectively surrounding the medium portion, which is surrounded by the medium portion wrapper, and components except the medium portion, wherein the medium portion wrapper includes laminated paper in which paper and metal having a preset thickness and thermal conductivity are laminated.

According to one or more embodiments of the present disclosure, there is provided a cigarette in which aerosols are generated from an aerosol base portion, an aerosol generating base material in a medium portion, and the medium portion through heating, the cigarette including a base-part wrapper surrounding the aerosol base portion, a medium portion wrapper surrounding the medium portion, and an outer shell collectively surrounding the aerosol base portion and the medium portion, which are respectively surrounded by the base part wrapper and the medium portion wrapper, and other components, wherein the base part wrapper and the medium portion wrapper each include laminated paper in which paper and metal having a preset thickness and heat conductivity are laminated.

Advantageous Effects of Disclosure

According to the present disclosure, aerosols generating a sufficient amount of smoke may be provided to a user using an aerosol generating device in initial puffs.

BEST MODE

Figure 1:
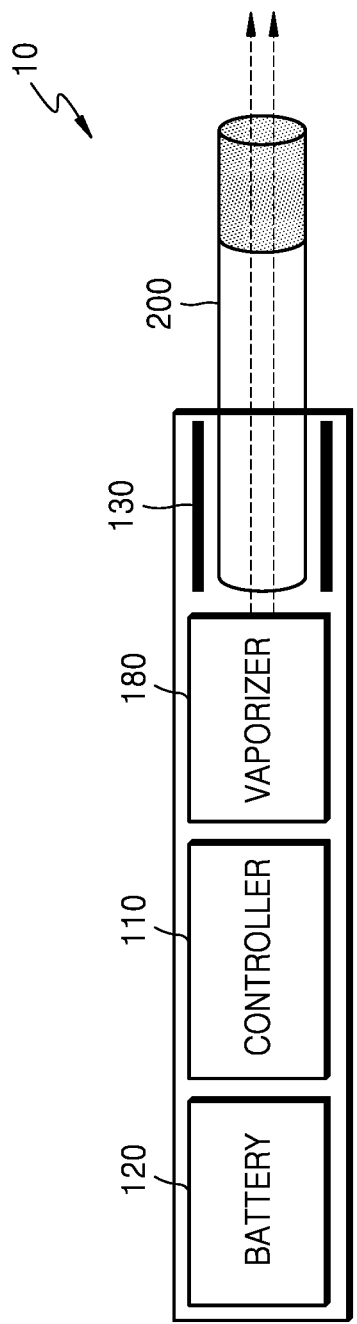
FIGS. 1 and 2 are diagrams showing examples in which a cigarette is inserted into an aerosol generating device.

According to one or more embodiments of the present disclosure, there is provided a cigarette in which an aerosol is generated from a medium in a medium portion through heating, the cigarette including a medium portion wrapper surrounding the medium portion, and an outer shell collectively surrounding the medium portion, which is surrounded by the medium portion wrapper, and components except the medium portion, wherein the medium portion wrapper includes laminated paper in which paper and metal having a preset thickness and thermal conductivity are laminated.

The thickness may be an arbitrarily determined value from about 6.3 μm to about 30 μm.

The metal may include aluminum.

The thickness may be an arbitrarily determined value from about 6 μm to about 30 μm.

The metal may include copper.

According to one or more embodiments of the present disclosure, there is provided a cigarette in which an aerosol is generated from a medium in a medium portion through heating, the cigarette including a medium portion wrapper surrounding the medium portion, and an outer shell collectively surrounding the medium portion, which is surrounded by the medium portion wrapper, and components except the medium portion, wherein the medium portion wrapper includes paper internally containing Activated Carbon Fiber (ACF).

The paper may internally contain the ACF at an arbitrarily determined ratio of about 25% to about 50%.

The paper may have a porosity value set in advance by containing the ACF internally.

According to one or more embodiments of the present disclosure, an aerosol generating device includes an external heating-type aerosol generating device for generating aerosols by using any one of the above cigarettes.

According to one or more embodiments of the present disclosure, there is provided a cigarette in which aerosols are generated from an aerosol base portion, an aerosol generating base material in a medium portion, and the medium portion through heating, the cigarette including a base-part wrapper surrounding the aerosol base portion, a medium portion wrapper surrounding the medium portion, and an outer shell collectively surrounding the aerosol base portion and the medium portion, which are respectively surrounded by the base part wrapper and the medium portion wrapper, and other components, wherein the base part wrapper and the medium portion wrapper each include laminated paper in which paper and metal having a preset thickness and heat conductivity are laminated.

The thickness may be an arbitrarily determined value from about 6.3 µm to about 30 µm.

The metal may include aluminum.

The thickness may be an arbitrarily determined value from about 6 µm to about 30 µm.

The metal may include copper.

According to a selective embodiment, there is provided a cigarette in which aerosols are generated from an aerosol base portion, an aerosol generating base material in a medium portion, and the medium portion through heating, the cigarette including a base-part wrapper surrounding the aerosol base portion, a medium portion wrapper surrounding the medium portion, and an outer shell collectively surrounding the aerosol base portion and the medium portion, which are respectively surrounded by the base part wrapper and the medium portion wrapper, and other components, wherein the base part wrapper and the medium portion wrapper each include laminated paper internally containing ACF.

The paper may internally contain the ACF at an arbitrarily determined ratio from about 25% to about 50%.

The paper may have a porosity value that is set in advance by containing the ACF internally.

Examples of an external heating-type aerosol generating device include an external heating-type aerosol generating device for generating aerosols by using the above cigarette. The external heating-type aerosol generating device is characterized in that, when the cigarette is coupled to a heater, an aerosol base portion of the cigarette is heated by the heater to indirectly increase a temperature of a medium included in the medium portion.

MODE OF DISCLOSURE

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. There are terms discretionally selected by an applicant on particular occasions. These terms will be explained in detail in relevant description. Therefore, terms used herein are not just names but should be defined based on the meaning of the terms and the whole content of the present disclosure.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

The attached drawings for illustrating one or more embodiments are referred to in order to gain a sufficient understanding, the merits thereof, and the objectives accomplished by the implementation. The disclosure may, however, be embodied in many different forms and should not be construed as being limited to the embodiments set forth herein.

Hereinafter, embodiments of the present disclosure will be described in detail with reference to the drawings.

Figure 2:
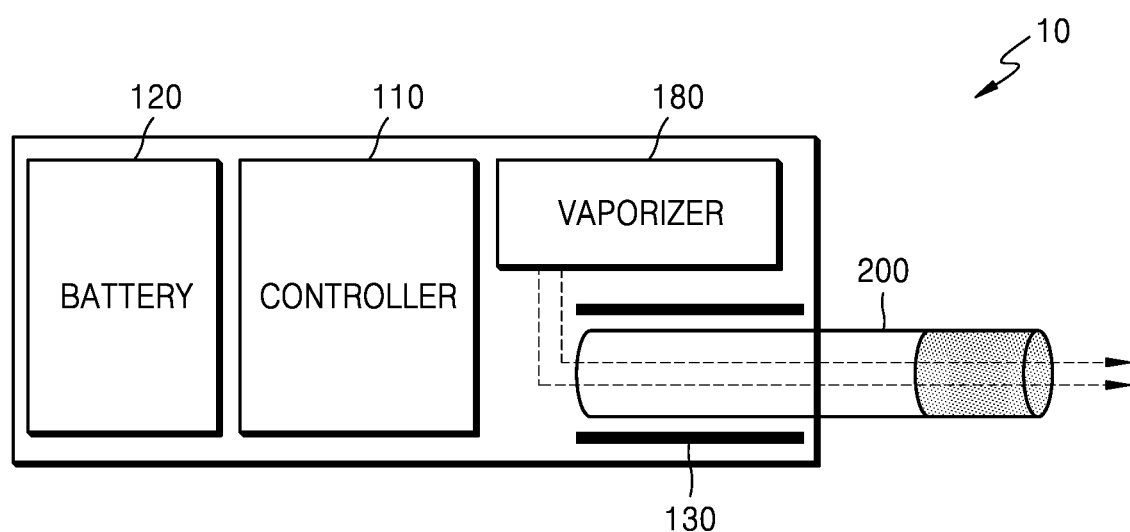

FIGS. 1 and 2 are diagrams showing examples in which a cigarette is inserted into an aerosol generating device.

Referring to FIGS. 1 and 2, an aerosol generating device 10 includes a battery 120, a controller 110, a heater 130 and a vaporizer 180. A cigarette 200 may be inserted into an internal space of the aerosol generating device 10.

The elements related to the embodiment are illustrated in the aerosol generating device 10 of FIGS. 1 to 2. Therefore, one of ordinary skill in the art would appreciate that other universal elements than the elements shown in FIGS. 1 to 2 may be further included in the aerosol generating device 10.

In addition, although it is shown that the heater 130 is included in the aerosol generating device 10 in FIGS. 1 and 2, the heater 130 may be omitted if necessary.

In FIG. 1, the battery 120, the controller 110, the heater 130 and the vaporizer 180 are arranged in a row. Also, FIG. 2 shows that the vaporizer 180 and the heater 130 are arranged in parallel with each other. However, an internal structure of the aerosol generating device 10 is not limited to the examples shown in FIG. 1 or 2. That is, according to a design of the aerosol generating device 10, arrangement of the battery 120, the controller 110, the heater 130, and the vaporizer 180 may be changed.

When the cigarette 200 is inserted into the aerosol generating device 10, the aerosol generating device 10 operates the heater 130 and/or the vaporizer 180 to generate aerosol from the cigarette 200 and/or the vaporizer 180. The aerosol generated by the vaporizer 180 may be transferred to a user via the cigarette 200. The vaporizer 180 will be described in more detail below.

The battery 120 supplies the electric power used to operate the aerosol generating device 10. For example, the battery 120 may supply power for heating the heater 130 or the vaporizer 180 and supply power for operating the controller 110. In addition, the battery 120 may supply power for operating a display, a sensor, a motor, and the like installed in the aerosol generating device 10.

The controller 110 controls the overall operation of the aerosol generating device 10. In detail, the controller 110 may control operations of other elements included in the aerosol generating device 10, as well as the battery 120, the heater 130, and the vaporizer 180. Also, the controller 110 may check the status of each component in the aerosol generating device 10 to determine whether the aerosol generating device 10 is in an operable state.

The controller 110 includes at least one processor. A processor can be implemented as an array of a plurality of logic gates or can be implemented as a combination of a general-purpose microprocessor and a memory in which a program executable in the microprocessor is stored. It will be understood by one of ordinary skill in the art that the present disclosure may be implemented in other forms of hardware.

The heater 130 may be heated by the electric power supplied from the battery 120. For example, when the cigarette is inserted in the aerosol generating device 10, the heater 130 may be located outside the cigarette. Therefore, the heated heater 130 may raise the temperature of an aerosol generating material in the cigarette.

The heater 130 may be an electro-resistive heater. For example, the heater 130 includes an electrically conductive track, and the heater 130 may be heated as a current flows through the electrically conductive track. However, the heater 130 is not limited to the above example, and any type of heater may be used provided that the heater is heated to a desired temperature. Here, the desired temperature may be set in advance on the aerosol generating device 10, or may be set by a user.

In addition, in another example, the heater 130 may include an induction heating type heater. In detail, the heater 130 may include an electrically conductive coil for heating the cigarette in an induction heating method, and the cigarette may include a susceptor that may be heated by the induction heating type heater.

In the FIGS. 1 and 2, the heater 130 is shown to be disposed outside the cigarette 200, but is not limited thereto. For example, the heater 130 may include a tubular heating element, a plate-shaped heating element, a needle-shaped heating element, or a rod-shaped heating element. And the inside or outside of the cigarette 200 is can be heated by the heating element.

Also, there may be a plurality of heaters 130 in the aerosol generating device 10. Here, the plurality of heaters 130 may be arranged to be inserted into the cigarette 200 or on the outside of the cigarette 200. Also, some of the plurality of heaters 130 may be arranged to be inserted into the cigarette 200 and the other may be arranged on the outside of the cigarette 200. In addition, the shape of the heater 130 is not limited to the example shown in FIGS. 1 and 2, but may be manufactured in various shapes.

The vaporizer 180 may generate aerosol by heating a liquid composition and the generated aerosol may be delivered to the user after passing through the cigarette 200. In other words, the aerosol generated by the vaporizer 180 may move along an air flow passage of the aerosol generating device 10, and the air flow passage may be configured for the aerosol generated by the vaporizer 180 to be delivered to the user through the cigarette.

For example, the vaporizer 180 may include a liquid storage unit, a liquid delivering unit, and a heating element, but is not limited thereto. For example, the liquid storage unit, the liquid delivering unit, and the heating element may be included in the aerosol generating device 10 as independent modules.

The liquid storage may store a liquid composition. For example, the liquid composition may be a liquid including a tobacco containing material including a volatile tobacco flavor component, or a liquid including a non-tobacco material. The liquid storage unit may be attached to/detached from the vaporizer 180 or may be integrally manufactured with the vaporizer 180.

For example, the liquid composition may include water, solvents, ethanol, plant extracts, flavorings, flavoring agents, or vitamin mixtures. The flavoring may include, but is not limited to, menthol, peppermint, spearmint oil, various fruit flavoring ingredients, etc. The flavoring agent may include components that may provide the user with various flavors or tastes. Vitamin mixtures may be a mixture of at least one of vitamin A, vitamin B, vitamin C, and vitamin E, but are not limited thereto. Also, the liquid composition may include an aerosol former such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivering unit. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 180 may be referred to as a cartomizer or an atomizer, but is not limited thereto.

The aerosol generating device 10 may further include universal elements, in addition to the battery 120, the controller 110, the heater 130, and the vaporizer 180. For example, the aerosol generating device 10 may include a display capable of outputting visual information and/or a motor for outputting tactile information. In addition, the aerosol generating device 10 may include at least one sensor (a puff sensor, a temperature sensor, a cigarette insertion sensor, etc.) Also, the aerosol generating device 10 may be manufactured to have a structure, in which external air may be introduced or internal air may be discharged even in a state where the cigarette 200 is inserted.

Although not shown in FIGS. 1 and 2, the aerosol generating device 10 may configure a system with an additional cradle. For example, the cradle may be used to charge the battery 120 of the aerosol generating device 10. Alternatively, the heater 130 may be heated in a state in which the cradle and the aerosol generating device 10 are coupled to each other.

The cigarette 200 may be similar to a typical burning cigarette. For example, the cigarette 200 may include a first portion containing an aerosol generating material and a second portion including a filter and the like. Alternatively, the second portion of the cigarette 200 may also include the aerosol generating material. For example, an aerosol generating material made in the form of granules or capsules may be inserted into the second portion.

The entire first portion may be inserted into the aerosol generating device 10 and the second portion may be exposed to the outside. Alternatively, only a portion of the first portion may be inserted into the aerosol generating device 10 or the entire first portion and a portion of the second portion may be inserted into the aerosol generating device 10. The user may puff aerosol while holding the second portion by the mouth of the user. At this time, the aerosol is generated by as the outside air passes through the first portion, and the generated aerosol passes through the second portion and is delivered to a user's mouth.

For example, the outside air may be introduced through at least one air passage formed in the aerosol generating device 10. For example, the opening and closing of the air passage formed in the aerosol generating device 10 and/or the size of the air passage may be adjusted by a user. Accordingly, the amount of smoke and a smoking impression may be adjusted by the user. In another example, the outside air may be introduced into the cigarette 200 through at least one hole formed in a surface of the cigarette 200.

Figure 3:
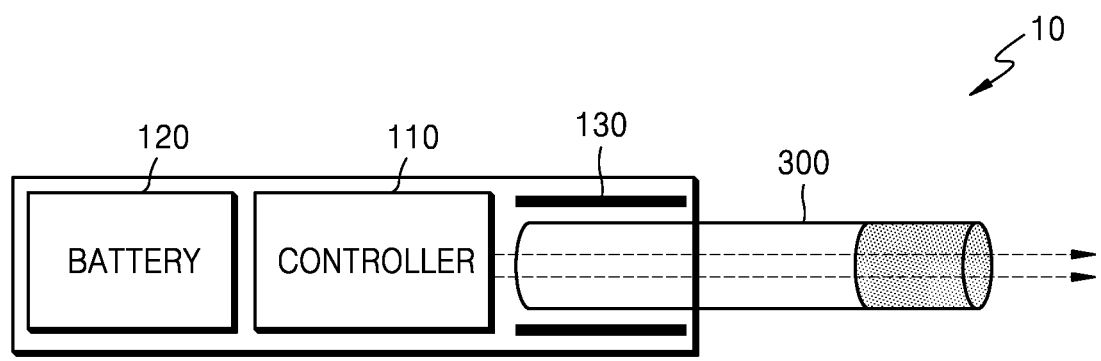
FIG. 3 is a diagram showing another example in which a cigarette is inserted into an aerosol generating device.

FIG. 3 is a diagram showing another example in which a cigarette is inserted into an aerosol generating device.

Compared with the aerosol generating device described with reference to FIGS. 1 and 2, the aerosol generating device 10 of FIG. 3 does not include the vaporizer 180. Because a dual-medium cigarette 300, which is inserted into the aerosol generating device 10 of FIG. 3, includes an element functioning as the vaporizer 180, the aerosol generating device 10 of FIG. 3 does not include the vaporizer 180 unlike the aerosol generating device of FIGS. 1 and 2.

When the dual-medium cigarette 300 is inserted, the aerosol generating device 10 of FIG. 3 externally heats the dual-medium cigarette 300 to general therefrom aerosols inhalable by the user. The dual-medium cigarette 300 will be described in detail with reference to FIG. 6.

Hereinafter, an example of a cigarette 200 is described with reference to FIG. 4.

Figure 4:
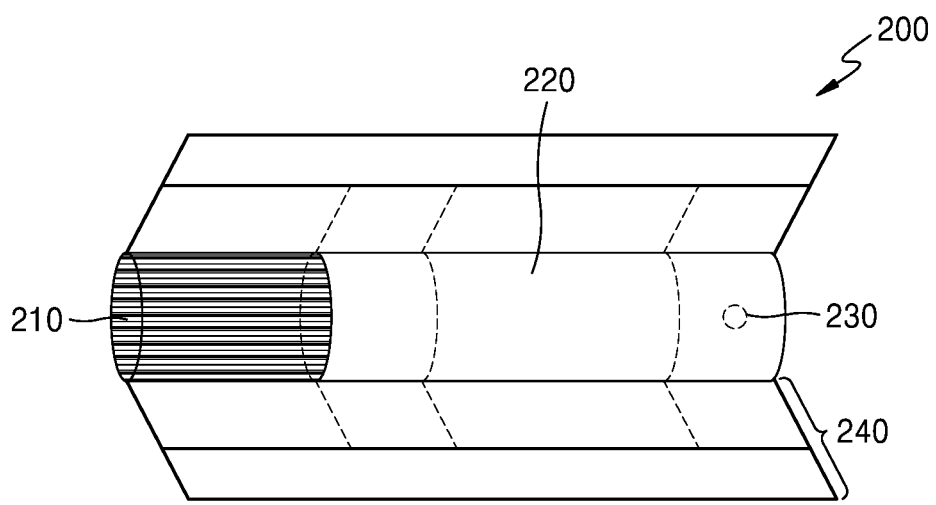
FIG. 4 is a diagram showing an example of a cigarette.

FIG. 4 is a drawing illustrating an example of a cigarette.

Referring to FIG. 4, the cigarette 200 includes a tobacco rod 210 and a filter rod 220. The first portion described above with reference to FIGS. 1 to 2 include the tobacco rod 210 and the second portion includes the filter rod 220.

In FIG. 4, the filter rod 220 is shown as a single segment, but is not limited thereto. In other words, the filter rod 220 may include a plurality of segments. For example, the filter rod 220 may include a first segment for cooling down the aerosol and a second segment for filtering a predetermined component included in the aerosol. Also, if necessary, the filter rod 220 may further include at least one segment performing another function.

The cigarette 200 may be packaged by at least one wrapper 240. The wrapper 240 may include at least one hole through which the outside air is introduced or inside air is discharged. For example, the cigarette 200 may be packaged by one wrapper 240. In another example, the cigarette 200 may be packaged by two or more wrappers 240. For example, the tobacco rod 210 may be packaged by a first wrapper and the filter rod 220 may be packaged by a second wrapper. In addition, the tobacco rod 210 and the filter rod 220 are respectively packaged by single wrappers, and then, the cigarette 200 may be entirely re-packaged by a third wrapper. When each of the tobacco rod 210 and the filter rod 220 includes a plurality of segments, each of the segments may be packaged by a single wrapper. In addition, the cigarette 200, in which the segments respectively packaged by the single wrappers are coupled to one another, may be re-packaged by another wrapper.

The tobacco rod 210 includes an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. In addition, the tobacco rod 210 may include other additive materials like a flavoring agent, a wetting agent, and/or an organic acid. Also, a flavoring liquid such as menthol, humectant, etc. may be added to the tobacco rod 210 by being sprayed to the tobacco rod 210.

The tobacco rod 210 may be manufactured variously. For example, the tobacco rod 210 may be fabricated as a sheet or a strand. Also, the tobacco rod 210 may be fabricated by tobacco leaves that are obtained by fine-cutting a tobacco sheet. Also, the tobacco rod 210 may be surrounded by a heat conducting material. For example, the heat-conducting material may be, but is not limited to, a metal foil such as aluminum foil. For example, the heat conducting material surrounding the tobacco rod 210 may improve a thermal conductivity applied to the tobacco rod by evenly dispersing the heat transferred to the tobacco rod 210, and thus, improving tobacco taste. Also, the heat conducting material surrounding the tobacco rod 210 may function as a susceptor that is heated by an inducting heating-type heater. Although not shown in the drawings, the tobacco rod 210 may further include a susceptor, in addition to the heat conducting material surrounding the outside thereof.

The filter rod 220 may be a cellulose acetate filter. In addition, the filter rod 220 is not limited to a particular shape. For example, the filter rod 220 may be a cylinder-type rod or a tube-type rod including a cavity therein. Also, the filter rod 220 may be a recess type rod. When the filter rod 220 includes a plurality of segments, at least one of the plurality of segments may have a different shape from the others.

The filter rod 220 may be manufactured to generate flavor. For example, a flavoring liquid may be sprayed to the filter rod 220 or separate fibers on which the flavoring liquid is applied may be inserted in the filter rod 220.

Also, the filter rod 220 may include at least one capsule 230. Here, the capsule 230 may generate flavor or may generate aerosol. For example, the capsule 230 may have a structure, in which a liquid containing a flavoring material is wrapped with a film. The capsule 230 may have a circular or cylindrical shape, but is not limited thereto.

When the filter rod 220 includes a segment for cooling down the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above examples, and may include any material provided that a function of cooling down the aerosol is implemented.

Although not shown in FIG. 4, the cigarette 200 according to the embodiment may further include a front-end filter. The front-end filter is at a side facing the filter rod 220, in the tobacco rod 210. The front-end filter may prevent the tobacco rod 210 from escaping to the outside and may prevent the liquefied aerosol from flowing to the aerosol generating device 10 (see FIGS. 1 to 2) from the tobacco rod 210 during smoking.

Figure 5:
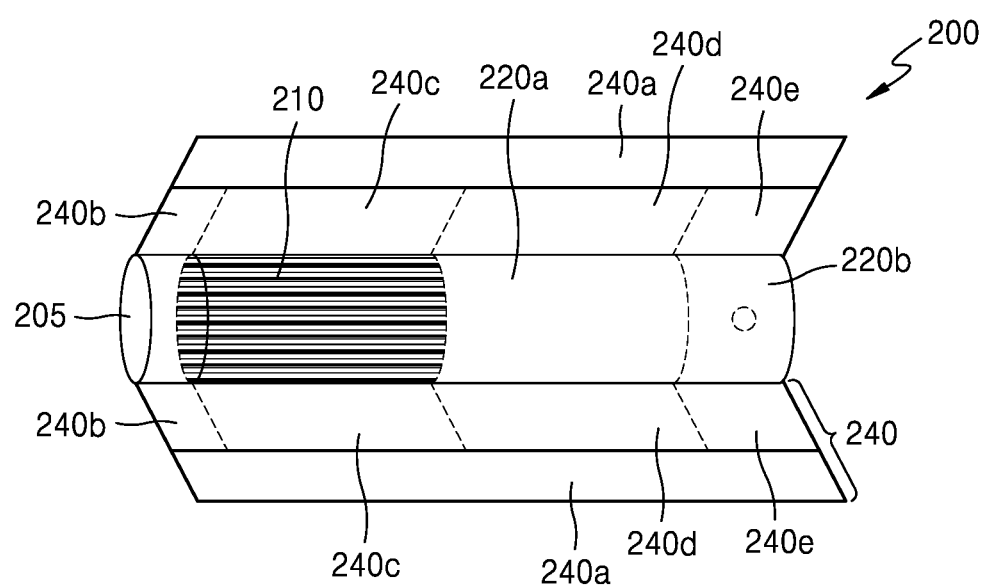
FIG. 5 is a diagram showing another example of a cigarette.

FIG. 5 is a view illustrating another example of a cigarette.

Referring to FIG. 5, it can be seen that the cigarette 200 has a form in which a cross tube 205, the tobacco rod 210, a tube 220a, and a filter 220b are wrapped by the final wrapper 240. In FIG. 5, the wrapper includes individual wrappers that are individually wrapped around the cross tube 205, the tobacco rod 210, the tube 220a, and the filter 220b, and a final wrapper that is collectively wrapped around the cross tube 205, the tobacco rod 210, the tube 220a, and the filter 220b.

The first portion described above with reference to FIGS. 1 and 2 includes the cross tube 205 and the tobacco rod 210, and the second portion includes the filter rod 220. For the sake of convenient description, the following description will be made with reference to FIGS. 1 and 2, and description overlapping with the description made with reference to FIG. 4 will be omitted.

The cross tube 205 refers to a cross-shaped tube connected to the tobacco rod 210.

When the cigarette 200 is inserted into the aerosol generating device, the cross tube 205 is a portion sensed by a cigarette detection sensor together with the cigarette rod 210, and is wrapped with the same copper laminated wrapper as the cigarette rod 210. The cigarette detection sensor can determine by detecting a copper laminated wrapper whether a cigarette inserted into an aerosol generating device is a type of cigarette used by the device. The copper laminated wrapper will be described later with reference to FIGS. 7 to 9.

The tobacco rod 210 includes an aerosol generating substrate that generates an aerosol by being heated by the heater 130 of the aerosol generation device 10.

The tube 220a performs a function of transferring an aerosol generated when an aerosol generating substrate of the tobacco rod 210 is heated by receiving the sufficient amount of energy from the heater 130 to the filter 220b. The tube 220a is manufactured in a manner in which triacetin (TA) which a plasticizer is added to a cellulose acetate tow by more than a certain amount to form a circle, and not only is different in shape but also has a difference in arrangement in that the tobacco rod 210 and the filter 220b are connected to each other, as compared with the cross tube 205.

When the aerosol generated by the tobacco rod 210 is transferred through the tube 220a, the filter 220b performs a function of allowing a user to puff the aerosol filtered by the filter 220b by passing the aerosol therethrough. The filter 220b may include a cellulose acetate filter manufactured based on a cellulose acetate tow.

The final wrapper 240 is paper that is wrapped around the cross tube 205, the tobacco rod 210, the tube 220a, and the filter 220b, and may include all of a cross tube wrapper 240b, a tobacco rod wrapper 240c, a tube wrapper 240d, and a filter wrapper 240e.

In FIG. 5, the cross tube wrapper 240b is wrapped by an aluminum wrapper, the tube 220a is wrapped by an MFW or 24K wrapper, and the filter 220b is wrapped by an oil-resistant hard wrapper or a lamination of a poly lactic acid (PLA) material. The tobacco rod wrapper 240c and the final wrapper 240 will be described in more detail below.

The tobacco rod wrapper 240c is wrapped around the tobacco rod 210 and may be coated with a thermal conductivity enhancement material to maximize efficiency of thermal energy transferred by the heater 130. For example, the tobacco rod wrapper 240c may be manufactured in a manner in which a general wrapper or heterotype base paper is coated with at least one of silver foil (Ag), aluminum foil (Al), copper foil (Cu), carbon paper, filler, ceramic (AlN, Al$_2$O$_3$), silicon carbide, sodium citrate (Na citrate), potassium citrate (K citrate), aramid fiber, nano cellulose, mineral paper, glassine paper, single-walled carbon nanotube (SWNT). A general wrapper refers to a wrapper applied to widely known cigarettes and refers to a porous wrapper made of a proven material that has both paper manufacturing workability and a thermal conductivity exceeding a certain value through a water paper test.

In addition, in the present disclosure, the final wrapper 240 may be manufactured in a manner in which an MFW (a kind of steriled paper) base paper is coated with at least one of filler, ceramic, silicon carbide, sodium citrate, potassium citrate, aramid fiber, nano cellulose, and SWNT among various materials coating the tobacco rod wrapper 240c.

The heater 130 included in the externally heated aerosol generation device 10 described in FIGS. 1 and 2 is a target controlled by the controller 110, and heats the aerosol generating substrate included in the tobacco rod 210 to generate an aerosol, and at this time, thermal energy transferred to the tobacco rod 210 is composed of a ratio of 75% by radiant heat, 15% by convective heat, and 10% by conductive heat. The ratio between the radiant heat, the convective heat, and the conductive heat constituting the thermal energy transferred to the tobacco rod 210 may be different depending on the embodiment.

In the present disclosure, in order to overcome the difficulty in quickly generating an aerosol because thermal energy may not be transferred with the heater 130 in direct contact with an aerosol generating substrate, the tobacco rod wrapper 240c and the final wrapper 240 are coated with a thermal conductivity enhancement material to prompt an efficient transfer of the thermal energy to the aerosol generating substrate of the tobacco rod 210, and thus, a sufficient amount of aerosol may be provided to a user even during an initial puff before the heater 130 is sufficiently heated.

Depending on the embodiment, only one of the tobacco rod wrapper 240c and the final wrapper 240 may also be coated with a thermal conductivity enhancement material, and the present disclosure may also be implemented in a manner in which the tobacco rod wrapper 240c or the final wrapper 240 is coated with organic metal, inorganic metal, fiber, or polymer material which has a thermal conductivity of a preset value, as well as the above-described examples.

Hereinafter, the processing of manufacturing the tobacco rod wrapper 240c and the final wrapper 240, and physical properties of the tobacco rod wrapper 240c and the final wrapper 240 will be described.

The tobacco rod wrapper 240c may be manufactured in a method of coating the above-described thermal conductivity-enhancing material on a general wrapper or release base paper and slitting the same. As an example of a method of coating the thermal conductivity-enhancing material on the general wrapper or release base paper, a pearl coating method may be used. Also, as an example of a slitting method, a slitting width may be about 24.5 mm, and according to an embodiment, the slitting width may differ.

As an example of manufacturing the tobacco rod wrapper 240c, a base wrapper of the tobacco rod wrapper 240c may include a general wrapper on which calendaring is performed.

TABLE 1

| CLASSI-FICATION | UNIT | 26.5 gsm GENERAL WRAPPER | | REMARK |
|---|---|---|---|---|
| | | BASE PAPER | AFTER CALENDARING | |
| BASIS WEIGHT | g/m$^2$ | 26.5 | 26.4 | |
| THICKNESS | μm | 45.1 | 34.5 | 23.5% REDUCTION |
| Density | g/cm$^3$ | 0.59 | 0.77 | |
| Bulk | cm$^3$/g | 1.70 | 1.31 | |
| TENSILE STRENGTH (MD) | kgf/15 mm | 5.81 | 5.67 | |

TABLE 1-continued

| CLASSI-FICATION | UNIT | 26.5 gsm GENERAL WRAPPER | | REMARK |
|---|---|---|---|---|
| | | BASE PAPER | AFTER CALENDARING | |
| SMOOTHNESS (SS) | sec | 28 | 200 | |
| SMOOTHNESS (RS) | | 8 | 150 | |
| Stiffness | cm$^3$ | 16 | 15 | |

Table 1 shows an example of physical properties of a general wrapper before a thermal conductivity-enhancing material was pearl-coated. Referring to Table 1, a general wrapper before the thermal conductivity-enhancing material was pearl-coated had a 23.5% decrease in thickness compared to base paper after calendaring, and other physical properties were also changed. The tobacco rod wrapper 240c may be manufactured by pearl-coating the thermal conductivity-enhancing material on the general wrapper on which the calendaring is completed. As a selective embodiment, the tobacco rod wrapper 240c may be manufactured by coating and calendaring the thermal conductivity-enhancing material on any one of the general wrapper, the release base paper, and MFW base paper. According to the present selective embodiment, to increase a transfer rate of the heat energy of an aerosol generating substrate of the cigarette 200, calendaring is performed on a wrapper, on which the thermal conductivity-enhancing material is coated first, instead of a wrapper on which calendaring is performed.

TABLE 2

| CLASSIFICATION | UNIT | 26.5 gsm GENERAL WRAPPER | | 35 gsm RELEASE BASE PAPER | | 60 gsm MFW BASE PAPER | |
|---|---|---|---|---|---|---|---|
| | | BASE PAPER | FINAL | BASE PAPER | FINAL | BASE PAPER | FINAL |
| BASIS WEIGHT | g/m$^2$ | 26.8 | 27.6 | 35.2 | 35.9 | 60.5 | 61.6 |
| COATING AMOUNT | | 2.24 | | 1.99 | | 1.98 | |
| THICKNESS | μm | 45 | 34.2 | 43 | 38.3 | 68.7 | 69.2 |
| Density | g/cm$^3$ | 0.6 | 0.81 | 0.82 | 0.94 | 0.88 | 0.89 |
| Bulk | cm$^3$/g | 1.68 | 1.24 | 1.22 | 1.07 | 1.14 | 1.12 |
| TENSILE STRENGTH (MD) | kgf/15 mm | 6.23 | 5.72 | 7.55 | 7.6 | 9.6 | 9.85 |
| TENSILE STRENGTH (CD) | | 1.08 | 1.32 | 1.9 | 1.92 | 2.58 | 2.59 |
| SMOOTHNESS (SS) | sec | 25 | 145 | 100 | 225 | 260 | 150 |
| SMOOTHNESS (RS) | | 8 | 110 | 80 | 175 | 75 | 40 |
| Stiffness | cm$^3$ | — | 16 | — | 26.9 | — | 66.4 |

Table 2 shows the comparison of physical properties before and after potassium citrate, a thermal conductivity-enhancing material, was coated on various wrappers. Referring to Table 2, depending on a material of a base wrapper, the tensile strength, the smoothness, and the stiffness of the tobacco rod wrapper 240c were changed at a ratio equal to or greater than a preset ratio by differently applying the coating amount from about 1.98% to about 2.24%. Here, the preset ratio indicates a ratio value calculated by experimental and mathematical calculations to increase the heat energy transferred to the aerosol generating substrate by a preset value or more.

TABLE 3

| CLASSIFICATION | UNIT | 26.5 gsm GENERAL WRAPPER | | 35 gsm RELEASE BASE PAPER | | 60 gsm MFW BASE PAPER | |
|---|---|---|---|---|---|---|---|
| | | BASE PAPER | FINAL | BASE PAPER | FINAL | BASE PAPER | FINAL |
| BASIS WEIGHT | g/m$^2$ | 26.6 | 27.2 | 34.7 | 35.6 | 60.2 | 61.2 |
| COATING AMOUNT | | 1.88 | | 2.31 | | 1.83 | |
| THICKNESS | μm | 44.7 | 32.2 | 42.8 | 38 | 67.4 | 69.2 |
| Density | g/cm$^3$ | 0.6 | 0.84 | 0.81 | 0.94 | 0.89 | 0.88 |
| Bulk | cm$^3$/g | 1.68 | 1.18 | 1.23 | 1.07 | 1.12 | 1.13 |
| TENSILE STRENGTH (MD) | kgf/15 mm | 6.14 | 5.63 | 7.92 | 7.88 | 9.88 | 9.79 |
| TENSILE STRENGTH (CD) | | 1.32 | 1.27 | 1.84 | 1.58 | 2.71 | 2.62 |

TABLE 3-continued

| | | 26.5 gsm GENERAL WRAPPER | | 35 gsm RELEASE BASE PAPER | | 60 gsm MFW BASE PAPER | |
|---|---|---|---|---|---|---|---|
| CLASSIFICATION | UNIT | BASE PAPER | FINAL | BASE PAPER | FINAL | BASE PAPER | FINAL |
| SMOOTHNESS (SS) | sec | 30 | 170 | 150 | 265 | 280 | 160 |
| SMOOTHNESS (RS) | | 10 | 135 | 70 | 165 | 80 | 40 |
| Stiffness | cm$^3$ | — | 16.4 | — | 27.4 | — | 63.3 |

Table 3 shows the comparison of physical properties before and after sodium citrate, which is a thermal conductivity-enhancing material, was coated on various wrappers. Referring to Table 3, depending on a material of a base wrapper, the tensile strength, the smoothness, and the stiffness of the tobacco rod wrapper 240c were changed at a ratio equal to or greater than a preset ratio by differently applying the coating amount from about 1.83% to about 2.31%. Here, the preset ratio indicates a ratio value calculated by experimental and mathematical calculations to increase the heat energy transferred to the aerosol generating substrate by a preset value or more.

As shown in Tables 2 and 3, the wrapper coated with potassium citrate or sodium citrate may be manufactured as the tobacco rod wrapper 240c through calendaring. Also, potassium citrate and sodium citrate described with reference to Tables 2 and 3 are examples of thermal conductivity-enhancing materials, and according to an embodiment, other thermal conductivity-enhancing materials, other than potassium citrate and sodium citrate, may be used.

which no thermal conductivity-enhancing material is not applied, and is an experimental group for confirming the effectiveness of the present disclosure. In Table 4, a general wrapper Na and a general wrapper K are general wrappers coated with 2% of sodium citrate and potassium citrate, respectively, and release base paper Na and release base paper K are release base paper coated with 2% of sodium citrate and potassium citrate, respectively. A general wrapper (pearl-coated) indicates an experimental group in which a specific thermal conductivity-enhancing material except potassium citrate and sodium citrate is applied to the general wrapper in a pearl-coating manner.

In general, according to Table 4, compared to the general wrapper (the control), an experimental group to which the thermal conductivity-enhancing material was applied showed little difference in the feeling of heat in the mouth, but had better results in terms of the amount of smoke, smoking taste strength, and flavor. Each result is relatively calculated by setting a maximum of nine points as a reference score. As described above, according to an embodi-

TABLE 4

| ITEM | AMOUNT OF SMOKE | HEAT IN MOUTH | HEAT OF MAINSTREAM SMOKE | SMOKING TASTE STRENGTH | STIMULATION | FLAVOR |
|---|---|---|---|---|---|---|
| GENERAL WRAPPER (CONTROL) | 4.5 | 3.7 | 3.6 | 2.8 | 3.0 | 3.1 |
| GENERAL WRAPPER (Na) | 4.8 | 3.7 | 3.8 | 3.1 | 3.2 | 3.5 |
| GENERAL WRAPPER (K) | 4.9 | 3.8 | 3.8 | 3.1 | 3.3 | 3.4 |
| RELEASE BASE PAPER (Na) | 4.8 | 3.7 | 3.8 | 3.0 | 3.2 | 3.3 |
| RELEASE BASE PAPER (K) | 4.8 | 3.7 | 3.6 | 3.1 | 3.2 | 3.4 |
| GENERAL WRAPPER (PEARL-COATED) | 4.9 | 3.7 | 3.6 | 3.0 | 3.0 | 3.4 |

Table 4 shows numerical results of indices, for example, the amount of smoke, flavors, and the like, which are directly associated with a smoking sensation when the aerosol generating device was operated using tobacco to which the tobacco rod wrapper 240c coated with the thermal conductivity-enhancing materials in Tables 1 to 3 was applied. To check how well the heat energy is transferred to the aerosol generating substrate included in a tobacco rod, the thermal conductivity-enhancing material was applied only to the tobacco rod wrapper 240c, and a thin paper inner was collectively applied to a final wrapper 240. In Table 4, a general wrapper (a control) means a general wrapper, to ment, the transfer rate of the heat energy of the heater 130 supplied to the aerosol generating substrate is increased by applying the thermal conductivity-enhancing material to the tobacco rod wrapper 240c, and thus, a sufficient amount of smoke and a satisfactory smoking sensation may be provided to the user using the external heating-type aerosol generating device.

The result according to Table 4 is a result of applying the thermal conductivity-enhancing material only to the tobacco rod wrapper 240c, and according to an embodiment, the thermal conductivity-enhancing material may be applied only to the final wrapper 240.

TABLE 5

| ITEM | AMOUNT OF SMOKE | HEAT IN MOUTH | HEAT OF MAINSTREAM SMOKE | SMOKING TASTE STRENGTH | STIMULATION | FLAVOR |
|---|---|---|---|---|---|---|
| MFW (CONTROL) | 4.5 | 3.6 | 3.6 | 3.1 | 3.0 | 3.6 |
| MFW (Na) | 4.7 | 3.7 | 3.7 | 3.3 | 3.1 | 3.8 |
| MFW (K) | 4.8 | 3.7 | 3.7 | 3.4 | 3.1 | 3.7 |

Table 5 numerically shows an increase in the smoking sensation of the user and the amount of smoke of the aerosol generated through the aerosol generating device when the thermal conductivity-enhancing material was applied only to the tobacco rod wrapper 240c. Referring to Table 5, the thermal conductivity-enhancing material was applied only to the final wrapper 240 to identify how well the heat energy is transferred to the aerosol generating substrate included in the tobacco rod, and a general porous wrapper was used as the tobacco rod wrapper 240c. In Table 5, MFW (a control) indicates MFW base paper to which no thermal conductivity-enhancing material is applied, and is an experimental group for confirming the effectiveness of the present disclosure. In Table 5, MFW (Na) and MFW (K) indicate MFW base paper coated with 2% of sodium citrate and potassium citrate, respectively.

According to Table 5, compared to the control, the final wrapper 240, to which the thermal conductivity-enhancing material was applied, showed little difference in the feeling of heat in the mouth, but had better results in terms of the amount of smoke, smoking taste strength, and flavor. As shown in Table 4, Table 5 shows results that are relatively calculated by setting a maximum of nine points as a reference score. As described above, according to an embodiment, the transfer rate of the heat energy of the heater 130 supplied to the aerosol generating substrate is increased by applying the thermal conductivity-enhancing material to the final wrapper 240, and thus, a sufficient amount of smoke and a satisfactory smoking sensation may be provided to the user using the external heating-type aerosol generating device.

Figure 6:
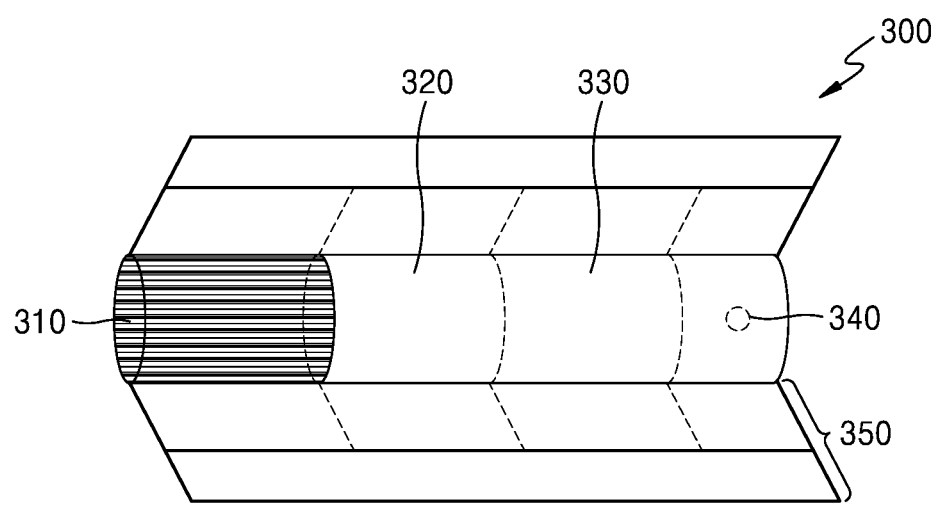
FIG. 6 is a diagram showing an example of a dual-medium cigarette used in the aerosol generating device of FIG. 3.

FIG. 6 is a diagram showing an example of a dual-medium cigarette used in the aerosol generating device of FIG. 3.

In FIG. 6, the term "dual-medium cigarette" is used not only to distinguish the term from the cigarette described with reference to FIGS. 4 and 5 but to describe the present disclosure concisely. According to an embodiment, the same term may be used for both a dual-medium cigarette and a general cigarette.

Referring to FIG. 6, the dual-medium cigarette 300 may have a configuration in which an aerosol base portion 310, a medium portion 320, a cooling portion 330, and a filter 340 are surrounded by a final wrapper 350. In FIG. 6, the final wrapper 350 denotes individual wrappers respectively surrounding the aerosol base portion 310, the medium portion 320, and the filter 340, and an outer shell surrounding the aerosol base portion 310, the medium portion 320, and the filter 340, which are respectively surrounded by the individual wrappers, in one.

The aerosol base portion 310 may be a portion shaped in a preset form by containing a moisturizer in pulp-based paper. A moisturizer (a base material) included in the aerosol base portion 310 includes propylene glycol and glycerin.

The moisturizer of the aerosol base portion 310 includes propylene glycol and glycerin having a certain weight ratio relative to a weight of base paper. When the dual-medium cigarette 300 is inserted into the aerosol generating device 10 of FIG. 3, the aerosol base portion 310 may be closest to the heater 130 of the external heating type, and when the dual-medium cigarette 300 is heated by the heater 130 to a temperature equal to or greater than a certain temperature, vapor containing the moisturizer is generated.

The medium portion 320 may include at least one of a sheet, a strand, or pipe tobacco formed of tiny bits cut from a tobacco sheet and generate nicotine to provide a smoking experience to the user. Although the dual-medium cigarette 300 is inserted into the aerosol generating device 10 of FIG. 3, the medium portion 320 may not be directly heated by the heater 130 and may be indirectly heated by a medium portion wrapper (or a final wrapper) surrounding the aerosol base portion 310 and the medium portion 320 through conduction, convection, and radiation. According to an embodiment, in consideration of characteristics in which a temperature that a medium in the medium portion 320 has to reach is lower than temperatures that moisturizers in the aerosol base portion 310 have to reach, the aerosol base portion 310 is heated by the external heating-type heater 130, and then the temperature of the medium portion 320 is indirectly increased. When the temperature of the medium in the medium portion 320 is increased to be equal to or greater than a certain temperature, nicotine vapor is generated from the medium portion 320.

According to an embodiment, when the dual-medium cigarette 300 is inserted into the aerosol generating device 10 of FIG. 3, part of the medium portion 320 may face the heater 130 and heated by the same.

The cooling portion 330 may be formed as a tube filter including a plasticizer having a certain weight, and moisturizer vapor and nicotine vapor generated from the aerosol base portion 310 and the medium portion 320 are mixed, aerosolized, and cooled by passing through the cooling portion 330. Unlike the aerosol base portion 310, the medium portion 320, and the filter 340, the cooling portion 330 is not surrounded by an individual wrapper.

The filter 340 may include a cellulose acetate filter, and shapes of the filter 340 are not limited. The filter 340 may include a cylinder-type rod or a tube-type rod having a hollow inside. When the filter 340 includes a plurality of segments, at least one of the plurality of segments may have a different shape. The filter 340 may be formed to generate flavors. For example, a flavoring liquid may be injected onto the filter 340, or an additional fiber coated with a flavoring liquid may be inserted into the filter 340.

Also, the filter 340 may include at least one capsule. The capsule may generate a flavor. For example, the capsule may have a configuration in which a liquid containing a flavoring material is wrapped with a film and may have a spherical or cylindrical shape. However, one or more embodiments are not limited thereto.

The final wrapper 350 indicates an outer shell surrounding in one the aerosol base portion 310, the medium portion 320, and the filter 340, which are respectively surrounded by the individual wrappers, and the final wrapper 350 may include the same material as a medium portion wrapper described below.

Hereinafter, as an individual wrapper wrapping the medium portion 320, the medium portion wrapper is described in detail.

TABLE 6

| NO | MANU-FACTURING METHOD | SAMPLE NAME | HEAT CONDUCTIVITY APTER ANALYSIS (W/mK) |
|---|---|---|---|
| 1 | INTERNAL ADDITION | GENERAL WRAPPING PAPER | 0.0499 |
| 2 | | SIC (0.5~1.4 μm) 10% internally added | 0.0591 |
| 3 | | SIC (2~10 μm) 10% internally added | 0.0469 |
| 4 | | SIC (2~10 μm) 15% internally added | 0.0409 |
| 5 | | SIC (2~10 μm) 20% internally added | 0.0395 |
| 6 | | SIC (2~10 μm) 30% internally added | 0.045 |
| 7 | | SIC (2~10 μm) 40% internally added | 0.042 |
| 8 | | AIN 10% internally added | 0.0334 |
| 9 | | Fe 10% internally added | 0.0526 |
| 10 | | Cu 10% internally added (POOR DISPERSION) | 0.0505 |
| 11 | | Al 10% internally added (POOR DISPERSION) | 0.0461 |
| 12 | | ACF | 1.14 |
| 13 | | CNT 0.5% | 0.036 |
| 14 | | CNT 0.1% | 0.044 |
| 15 | | CNT 2.0% | 0.043 |
| 16 | | ACF 25% POROSITY 4 | 1.362 |
| 17 | | ACF 25% POROSITY 5 | 1.773 |
| 18 | | ACF 25% GENERAL 1 | 1.536 |
| 19 | | ACF 25% GENERAL 2 | 1.242 |
| 20 | | ACF 25% GENERAL 3 | 1.221 |
| 21 | CIGARETTE-PAPER | $Fe_2O_3$ | 1.22 |
| 22 | LAMINATED PAPER | Al 6.3 μm | 28 |
| 23 | | Al 12 μm | 42 |
| 24 | | Al 20 μm | 55.4 |
| 25 | | Al 30 μm | 64.3 |
| 26 | | Cu 6 μm | 81 |
| 27 | | Cu 10 μm | 125.5 |
| 28 | | Cu 20 μm | 189.9 |

Table 6 shows data regarding thermal conductivity changing according to manufacturing methods or characteristics of the medium portion wrapper.

In detail, the data according to Table 6 includes results obtained as Korea Carbon Industry Promotion Agency measures the heat conductivity by forming hand-made paper in different manners and using different materials. Referring to Table 6, when a medium portion wrapper is formed in an internal addition manner, the heat conductivity of the medium portion wrapper is significantly lower than the heat conductivity of the medium portion wrapper formed in a lamination manner.

In order to add metal to paper internally, metal powder has to float on the water along with the pulp. However, because the metal powder is not distributed well in water because of the high specific gravity of metal, the metal powder and pulp are separated into layers, and thus, the addition may not be properly performed at a ratio of 50% or greater. Also, even if the metal powder is successfully added to the paper, it is not possible to add the metal powder internally at more than 50% relative to a weight of a general wrapper (wrapping paper), and a 50% addition rate is not enough to effectively produce phonon vibration, which is a heat-conductive mechanism, in the medium portion wrapper, and thus, no significant level of heat conductivity is detected regardless of the type of metal added to the paper.

Referring to Table 6, when Activated Carbon Fibers (ACFs) are added to paper internally, ACFs are twisted in many areas, and thus, the heat conductivity greatly increases despite an addition ratio. When metal and paper are laminated, the heat conductivity of the medium portion wrapper is relatively great in any one of the aforementioned methods. Also, the greater the thickness of the same metal is, and the greater the heat conductivity of metal having the same thickness is, the greater the efficiency of the heat transferred to the medium portion 320 becomes. As shown in Table 6, when a medium portion wrapper is formed by laminating copper having a thickness of about 20 um, the above medium portion wrapper has much greater heat conductivity than medium portion wrappers differently manufactured. The wrapper formed in the lamination manner surrounds a subject so that the inside may be exposed to a metal portion and the outside may be exposed to a paper portion.

Also, referring to FIG. 6, although ACFs are added to paper at identical ratios, when a porosity value of the ACF is greater, the heat conductivity of the ACF is greater as well. Here, the unit of the porosity value may be percent (%) when the porosity value is in a percent ratio and may be a micrometer (μm) when the porosity value is a porosity diameter.

The present disclosure is designed based on the result shown in Table 6. According to an embodiment, the efficiency of heat transferred to the medium portion 320 may be increased by using the medium portion wrapper in which metal having a preset thickness and heat conductivity and paper are laminated. According to an embodiment, by using the wrapper, which is formed by laminating the paper with the metal, as the medium portion wrapper, the heat energy of the heater may be effectively transferred to the medium portion 320, and a sufficient amount of smoke may be provided to the user in initial puffs.

According to another embodiment, the wrapper of the aerosol base portion 310 may include the same material as the medium portion wrapper described above. That is, the wrapper surrounding the aerosol base portion 310 may include paper laminated with metal having a preset thickness and thermal conductivity. According to the present embodiment, the efficiency of the heat energy of the heater that is transferred to the aerosol base portion 310 is also increased in addition to the increase in the efficiency of the heat energy to the medium portion 320, and thus, the aerosol generating device may generate an aerosol capable of providing a uniform and satisfactory smoking sensation to the user even though the temperature of the heater is recklessly increased and not maintained for a long time.

Figure 7:
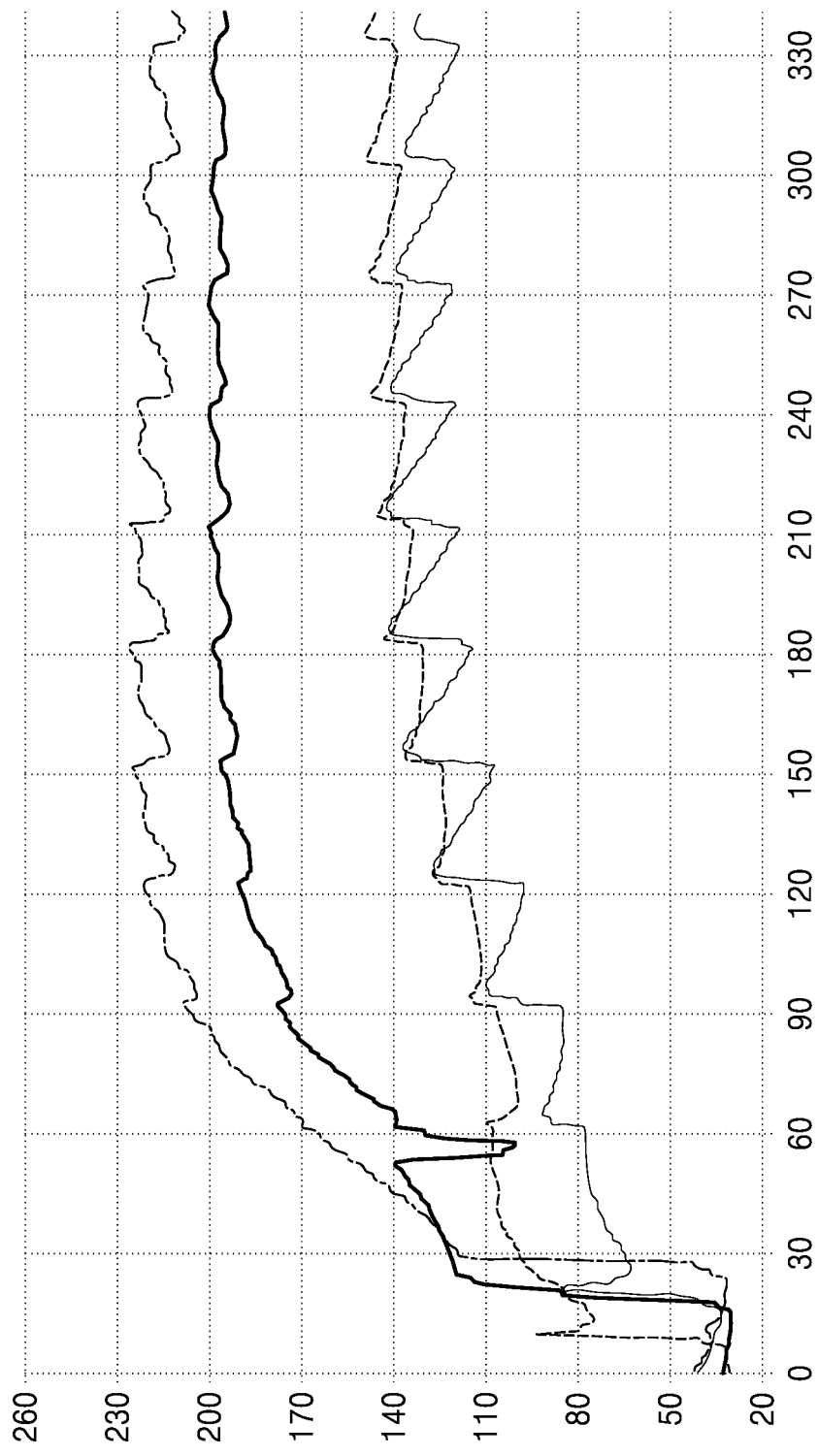
FIG. 7 is a diagram showing a result of comparing a temperature increase curve of an existing cigarette with a temperature increase curve of a dual-medium cigarette.

FIG. 7 shows a result of comparing a temperature increase curve of an existing cigarette to a temperature increase curve of a dual-medium cigarette.

In more detail, FIG. 7 includes four graphs in total, and hereinafter, four graphs will be paired when interpreted. FIG. 7 is described with reference to FIG. 6.

First of all, referring to FIG. 7, when the aerosol base portion 310 and the medium portion 320 are general wrappers, the temperature of the aerosol base portion 310 is the highest (about 230 degrees Celsius), and the temperature of the medium portion 320 is the lowest (about 140 degrees Celsius at maximum).

Referring to FIG. 7, when the aerosol base portion 310 and the medium portion 320 are double aluminum foil wrappers, the temperature of the aerosol base portion 310 is about 200 degrees Celsius, and the temperature of the medium portion 320 is higher than the temperature of the medium portion 320 when the medium portion 320 is the general wrapper. Here, the double aluminum foil wrapper is formed in a lamination manner, and a main component of the laminated paper is aluminum.

FIG. 7 shows that, when the dual-medium cigarette 300 is first heated as the aerosol base portion 310 receives the heat energy from the external heating-type heater 130, secondly, under influence of the first heating, the medium portion 320 is heated to generate an aerosol. When the double aluminum foil wrappers are applied to the aerosol base portion 310 and the medium portion 320, the aerosol base portion 310 is sufficiently heated with much less heat energy from the heater 130 than when the general wrappers are applied, and heats the medium portion 320 to generate aerosols. In FIG. 7, a temperature deviation when the double aluminum foil wrappers are applied to the aerosol base portion 310 and the medium portion 320 is much less than a temperature deviation when the general wrappers are applied to the aerosol base portion 310 and the medium portion 320.

[Equation 1]

$$|A-B|<|A^*-B^*|$$

Equation 1 shows the results of FIG. 7 as a mathematical statement. In Equation 1, A indicates the temperature of the aerosol base portion 310 that is the double aluminum foil wrapper in a state in which the heater of the aerosol generating device is preheated sufficiently enough to generate an aerosol and is stabilized, B indicates the temperature of the medium portion 320 in the same state, and $A^*$ and $B^*$ respectively indicate the temperatures of the aerosol base portion 310 and the medium portion 320 that are general wrappers.

Figure 8:
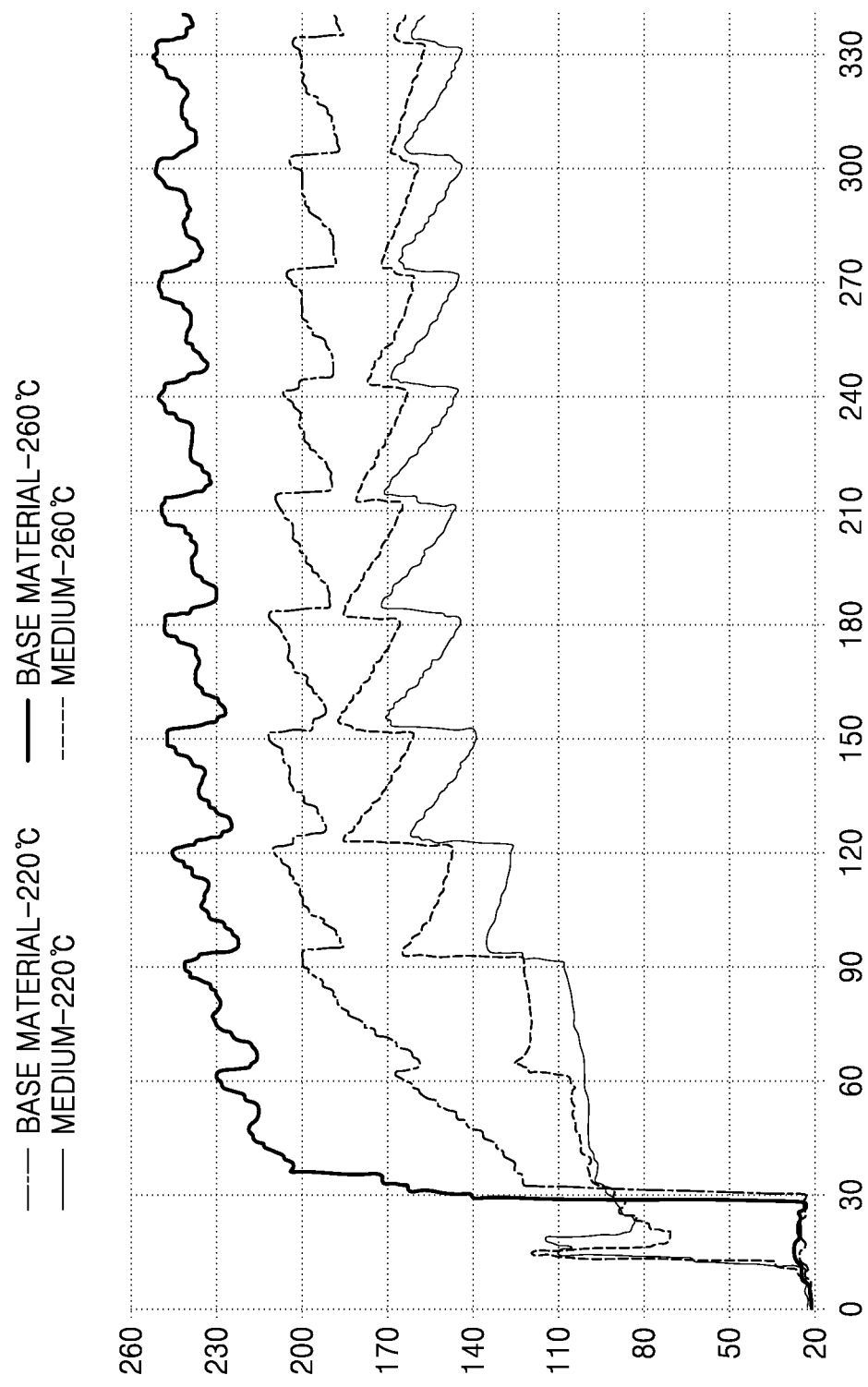
FIG. 8 is a diagram showing an example of a temperature change curve of a dual-medium cigarette when the present disclosure is applied.

FIG. 8 is a diagram of an example of a temperature change curve of a dual-medium cigarette when the present disclosure is applied.

FIG. 8 collectively shows temperature changes of the aerosol base portion 310 and the medium portion 320 when the temperatures of the aerosol base portion 310 and the medium portion 320 that heat the dual-medium cigarette 300 are 260 degrees Celsius and 220 degrees Celsius. Referring to FIG. 8, as the efficiency of heat energy transferred to the aerosol base portion 310 and the medium portion 320 is maximized, the temperature of the aerosol base portion 310 repeatedly increases and decreases to a temperature close to the temperature of the heater 130 (260 or 220 degrees). As the temperature of the aerosol base portion 310 is changed, the temperature of the medium portion 320 is also changed.

Figure 9:
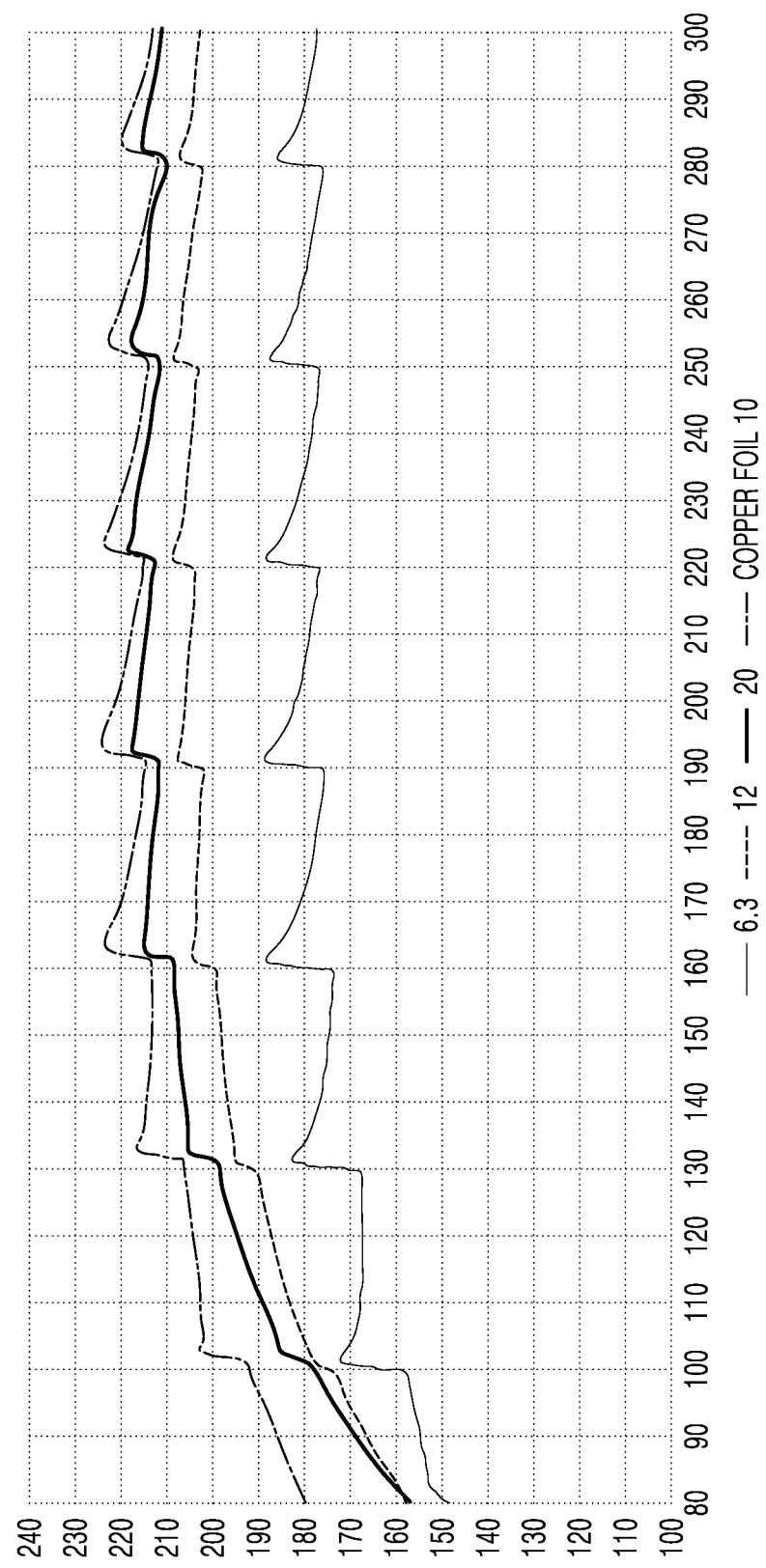
FIG. 9 is a diagram showing another example of a temperature change curve of a dual-medium cigarette when the present disclosure is applied.

FIG. 9 is a diagram of another example of a temperature change curve of a dual-medium cigarette when the present disclosure is applied.

In more detail, FIG. 9 visually shows results when the wrappers of the aerosol base portion 310 and the medium portion 320 in the dual-medium cigarette 300 are silver foil (silver and paper are laminated) and copper foil (copper and paper are laminated). Referring to FIG. 9, the greater the thickness of the same silver foil is, and the greater the heat conductivity is regardless of the thickness, a time taken to reach a target temperature (180 degrees Celsius) of the medium portion 320 is reduced.

When aluminum or copper described with reference to Table 6 is used as the wrappers of the aerosol base portion 310 and the medium portion 320 instead of silver or copper described with reference to FIG. 9, a time taken to reach the target temperature of the medium portion 320 may be shorter. Table 7 shows a summary of results when aluminum and copper have different thicknesses.

TABLE 7

| LAMINATED METAL | | TIME TAKEN TO REACH 180° C. |
|---|---|---|
| MEDIUM PORTION | Al 6.3 μm | 131 SECONDS |
| | Al 12 μm | 104 SECONDS |
| | Al 20 μm | 100 SECONDS |
| | Al 10 μm | 80 SECONDS |

Table 7 shows a result including 40 seconds of a preheating time of the heater. Referring to Table 7, when copper is selected as metal laminated with the wrapper, a time taken to reach a target temperature of the medium portion 320 is the shortest, and it is expected that the time continues to decrease when a thickness of copper is increased by more than 10 μm.

TABLE 8

| ITEM | | TPM | Nico | PG | Gly | MOISTURE |
|---|---|---|---|---|---|---|
| Al 6.3 um | mg/stick | 35.38 | 0.58 | 2.35 | 2.7 | 14.1 |
| | CV (%) | 4.14 | 13.9 | 22.6 | 27 | 7.9 |
| Al 12 um | mg/stick | 37.55 | 0.71 | 3.46 | 4.89 | 15.04 |
| | CV (%) | 2.75 | 14.4 | 21.7 | 33 | 8.2 |
| Al 20 um | mg/stick | 40.61 | 0.71 | 3.46 | 4.89 | 17.1 |
| | CV (%) | 4.72 | 14.4 | 21.7 | 33 | 8.2 |
| Cu 10 um | mg/stick | 42.41 | 0.81 | 2.79 | 3.79 | 17.7 |
| | CV (%) | 2.7 | 6.1 | 5.3 | 13.5 | 3.4 |

Table 8 shows a result of analyzing components of an aerosol generated when the present disclosure is applied to the dual-medium cigarette 300. Referring to Table 8, as an aluminum thickness increases in the medium portion 320, total particulate matters (TPMs) tend to increase, and in the case of copper laminated paper, although a thickness of the copper laminated paper is less than that of aluminum laminated paper, the copper laminated paper has a greater TPM value.

During the initial preheating, a time, which is taken for the medium portion 320 to reach 100 degrees Celsius when an aluminum laminated wrapper is used, is longer than a time when a copper laminated wrapper is used, and thus, a transition amount of propylene glycol (PG) and glycerin (Gly) by the initial heat transfer is greater when the aluminum laminated wrapper is used. However, a time, which is taken for an end portion of the medium portion 320 to reach 180 degrees Celsius when the copper laminated wrapper is used, is significantly shorter than a time taken when using the aluminum laminated wrapper because of excellent horizontal heat transfer, and the transition amount of TPM, nicotine, and moisture is great accordingly. In general, Table 8 shows that the copper laminated wrapper is more effective than the aluminum laminated wrapper in terms of an increase in atomization.

According to one or more embodiments, in initial puffs, an aerosol generating a sufficient amount of smoke may be provided to the user using the aerosol generating device.

Also, when the user smokes by using the external heating-type aerosol generating device, the heat energy of the heater is sufficiently transferred to the aerosol generating substrate, and thus, the user may feel more satisfied than when using an existing external heating-type aerosol generating device.

The specific implementations described in the present disclosure are example embodiments and do not limit the scope of the present disclosure in any way. For brevity of the specification, descriptions of existing electronic configurations, control systems, software, and other functional aspects of the systems may be omitted. Connections of lines or connection members between components illustrated in the drawings illustratively show functional connections and/or physical or circuit connections and may be represented as alternative or additional various functional connections, physical connections, or circuit connections in an actual device. Unless specifically mentioned, such as "essential", "importantly", etc., the components may not be necessary components for application of the present disclosure.

As used herein (in particular, in claims), use of the term "the" and similar indication terms may correspond to both singular and plural. When a range is described in the present disclosure, the present disclosure may include the invention to which individual values belonging to the range are applied (unless contrary description), and each individual value constituting the range is the same as being described in the detailed description of the disclosure. Unless there is an explicit description of the order of the steps constituting the method according to the present disclosure or a contrary description, the steps may be performed in an appropriate order. The present disclosure is not necessarily limited to the description order of the steps. The use of all examples or example terms (for example, etc.) is merely for describing the present disclosure in detail, and the scope of the present disclosure is not limited by the examples or the example terms unless the examples or the example terms are limited by claims. It will be understood by one of ordinary skill in the art that various modifications, combinations, and changes may be made according to the design conditions and factors within the scope of the appended claims or equivalents thereof.

INDUSTRIAL APPLICABILITY

The present disclosure may be used in manufacturing next-generation electronic cigarette devices and cigarettes used in the devices.

The invention claimed is:

1. A cigarette for use with an aerosol generating device, the cigarette comprising:
a medium portion wrapper surrounding a first medium portion which includes a medium configured to generate an aerosol when heated;
a second medium portion directly adjacent to the first medium portion, the second medium portion comprising at least one of a sheet, a strand, or pipe tobacco formed of tiny bits cut from a tobacco sheet to generate nicotine; and
an outer shell surrounding the first medium portion, which is surrounded by the medium portion wrapper, the second medium portion and components other than the first medium portion and the second medium portion, collectively,
wherein the medium portion wrapper comprises laminated paper in which paper and metal having a preset thickness and thermal conductivity are laminated,
wherein the medium portion wrapper is coated with a thermal conductivity enhancement material comprising at least one of potassium citrate and sodium citrate, and
wherein the first medium portion is configured to be heated by a heater external to the cigarette and the second medium portion is configured to be heated by the outer shell.

2. The cigarette of claim 1, wherein the thickness is an arbitrarily determined value from about 6.3 μm to about 30 μm.

3. The cigarette of claim 2, wherein the metal comprises aluminum.

4. The cigarette of claim 1, wherein the thickness is an arbitrarily determined value from about 6 μm to about 30 μm.

5. The cigarette of claim 4, wherein the metal comprises copper.

6. A cigarette for use with an aerosol generating device, the cigarette comprising:
a medium portion wrapper surrounding a first medium portion which includes a medium configured to generate an aerosol when heated;
a second medium portion directly adjacent to the first medium portion, the second medium portion comprising at least one of a sheet, a strand, or pipe tobacco formed of tiny bits cut from a tobacco sheet to generate nicotine; and
an outer shell surrounding the first medium portion, which is surrounded by the medium portion wrapper, the second medium portion, and components other than the first medium portion and the second medium portion, collectively,
wherein the medium portion wrapper comprises paper containing Activated Carbon Fiber (ACF) internally,
wherein the medium portion wrapper is coated with a thermal conductivity enhancement material comprising at least one of potassium citrate and sodium citrate, and
wherein the first medium portion is configured to be heated by a heater external to the cigarette and the second medium portion is configured to be heated by the outer shell.

7. The cigarette of claim 6, wherein the paper internally contains the ACF at an arbitrarily determined ratio of about 25% to about 50%.

8. The cigarette of claim 6, wherein the paper has a porosity value set in advance by containing the ACF internally.

9. A cigarette for use with an aerosol generating device, the cigarette comprising:
a base part wrapper surrounding an aerosol base portion which includes an aerosol generating material configured to generate an aerosol when heated;
a medium portion wrapper surrounding a medium portion which includes a medium configured to generate the aerosol when heated; and
an outer shell surrounding the aerosol base portion and the medium portion, which are respectively surrounded by the base portion wrapper and the medium portion wrapper, and other components, collectively,
wherein the base portion wrapper and the medium portion wrapper each comprise laminated paper in which paper and metal having a preset thickness and heat conductivity are laminated, and
wherein the base portion wrapper or the medium portion wrapper is coated with a thermal conductivity enhancement material comprising at least one of potassium citrate and sodium citrate, and wherein the aerosol base portion is configured to be heated by a heater external to the cigarette and the medium portion is configured to be heated by the outer shell.

10. The cigarette of claim 9, wherein the thickness is an arbitrarily determined value from about 6.3 μm to about 30 μm.

11. The cigarette of claim 10, wherein the metal comprises aluminum.

12. The cigarette of claim 9, wherein the thickness is an arbitrarily determined value from about 6 μm to about 30 μm.

13. The cigarette of claim 12, wherein the metal comprises copper.

* * * * *